(No Model.)

H. McCOLLUM & J. PARR.
CRACKER MACHINE.

No. 307,563.

3 Sheets—Sheet 2.

Patented Nov. 4, 1884.

Witnesses.

Inventors
Henry McCollum and Joseph Parr
by their attorney W. C. Witter (No Model.) 3 Sheets—Sheet 3.
H. McCOLLUM & J. PARR.
CRACKER MACHINE.
No. 307,563. Patented Nov. 4, 1884.
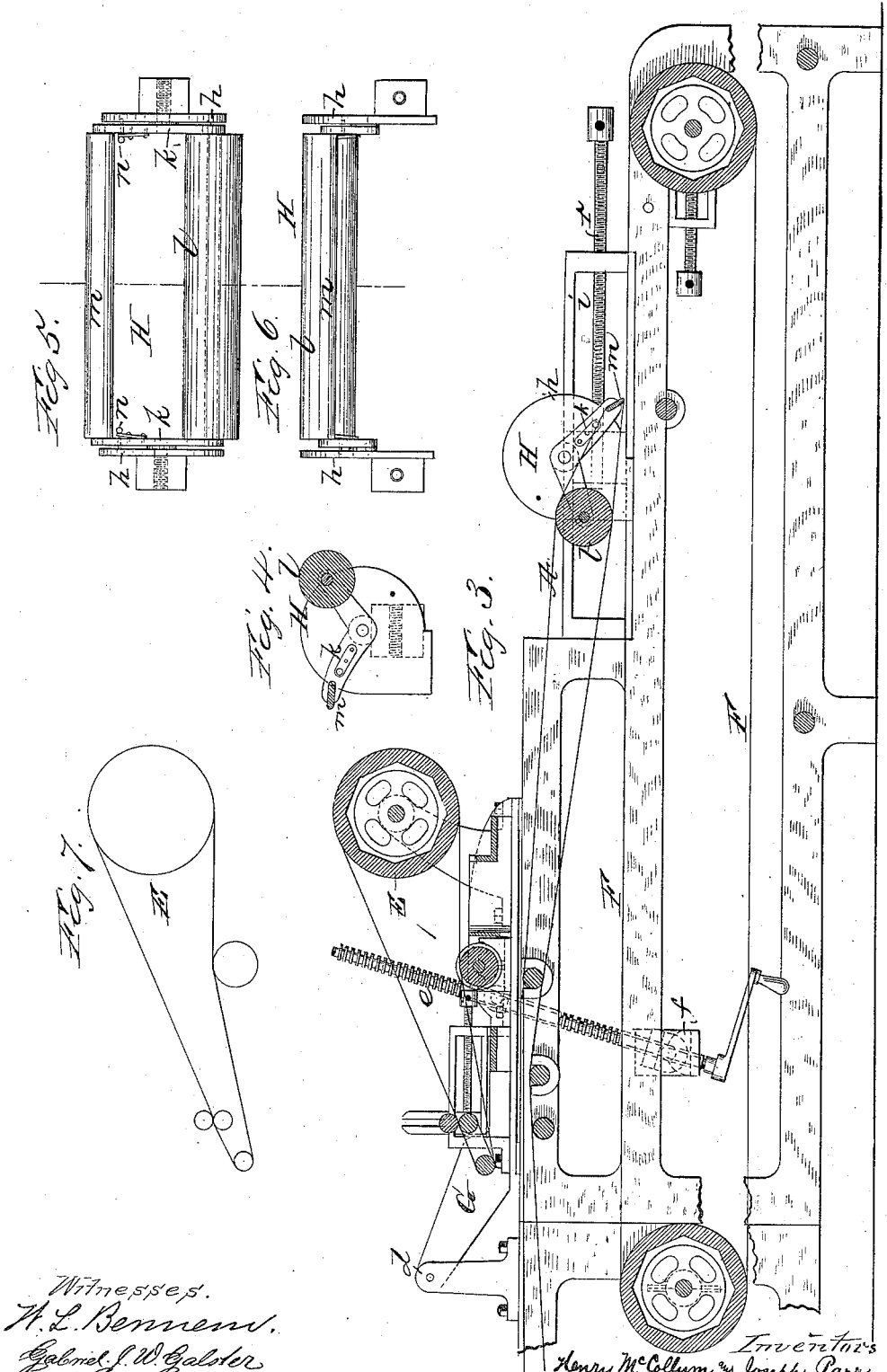
Witnesses:
H. L. Bennem
Gabriel J. W. Galster
Inventors:
Henry McCollum and Joseph Parr
by their attorney W. E. Witter

UNITED STATES PATENT OFFICE.

HENRY McCOLLUM AND JOSEPH PARR, OF NEW YORK, N. Y.

CRACKER-MACHINE.

SPECIFICATION forming part of Letters Patent No. 307,563, dated November 4, 1884.

Application filed February 27, 1884. (No model.)

*To all whom it may concern:*

Be it known that we, HENRY MCCOLLUM and JOSEPH PARR, citizens of the United States, residing in the city of New York, in the county and State of New York, have jointly invented a certain new and useful Improvement in Cracker-Machines, of which we declare the following to be a full, clear, and exact description, so that any person skilled in the art or science to which it appertains can make, construct, and use the same, reference being had to the accompanying drawings, which form a part of this specification, and to the letters and figures of reference thereon.

The invention relates to machines in which crackers are cut from the dough and properly manipulated prior to baking.

The object of the present invention is to produce a machine which shall be capable of use either as a panner or as as a peeling-machine— that is to say, a machine whose parts may be so adjusted as to deliver the cut crackers directly upon pans, as is done with fine and small crackers, or so as to allow of the cut crackers being peeled off the cracker-apron by the use of the ordinary peeling knife or shovel, as is done with soda, milk, and other large crackers.

The invention consists in supporting the scrap apparatus—that is, the apparatus which removes the scrap from fine-cut crackers—upon a cast-iron or any suitable frame which is made capable of swinging upon a pivot, whereby the entire scrap apparatus may be swung out of the way and the cracker-apron properly exposed for the peeling.

It also consists in the use of additional length of cracker-apron, which is made to pass around an additional roller below the large driving-roller at the back end of the machine, whereby when the machine is to be used as a "peeler," as it is called, a still greater surface of apron for the peeling operation than that exposed by the swinging out of the way of the scrap apparatus may be had at the front end of the machine, the additional roller being removed, and the front roller reversed and moved forward in suitable bearings until the slack of the apron is taken up.

The accompanying drawings represent our invention in its preferred form.

Figure 1:
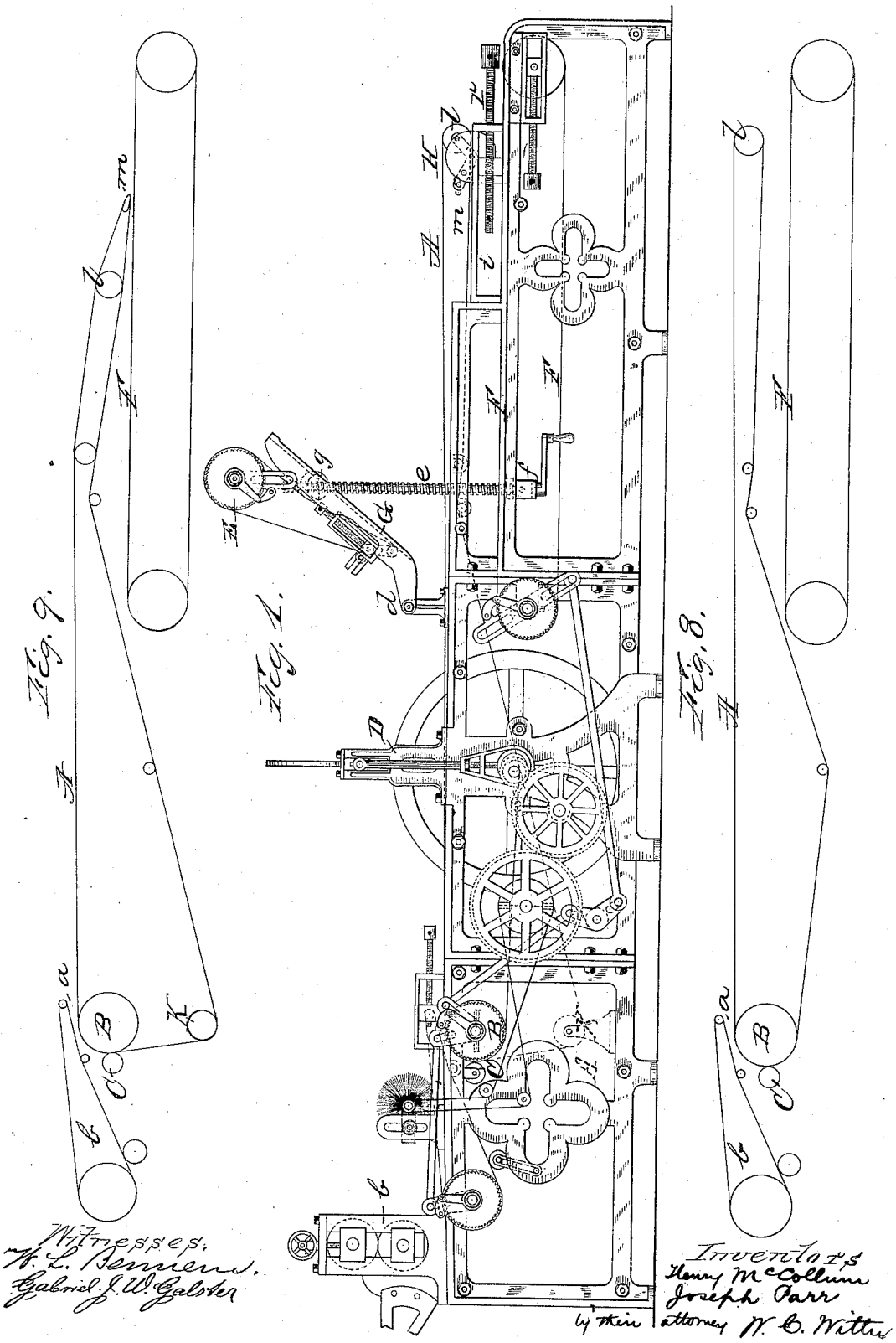
Figure 2:
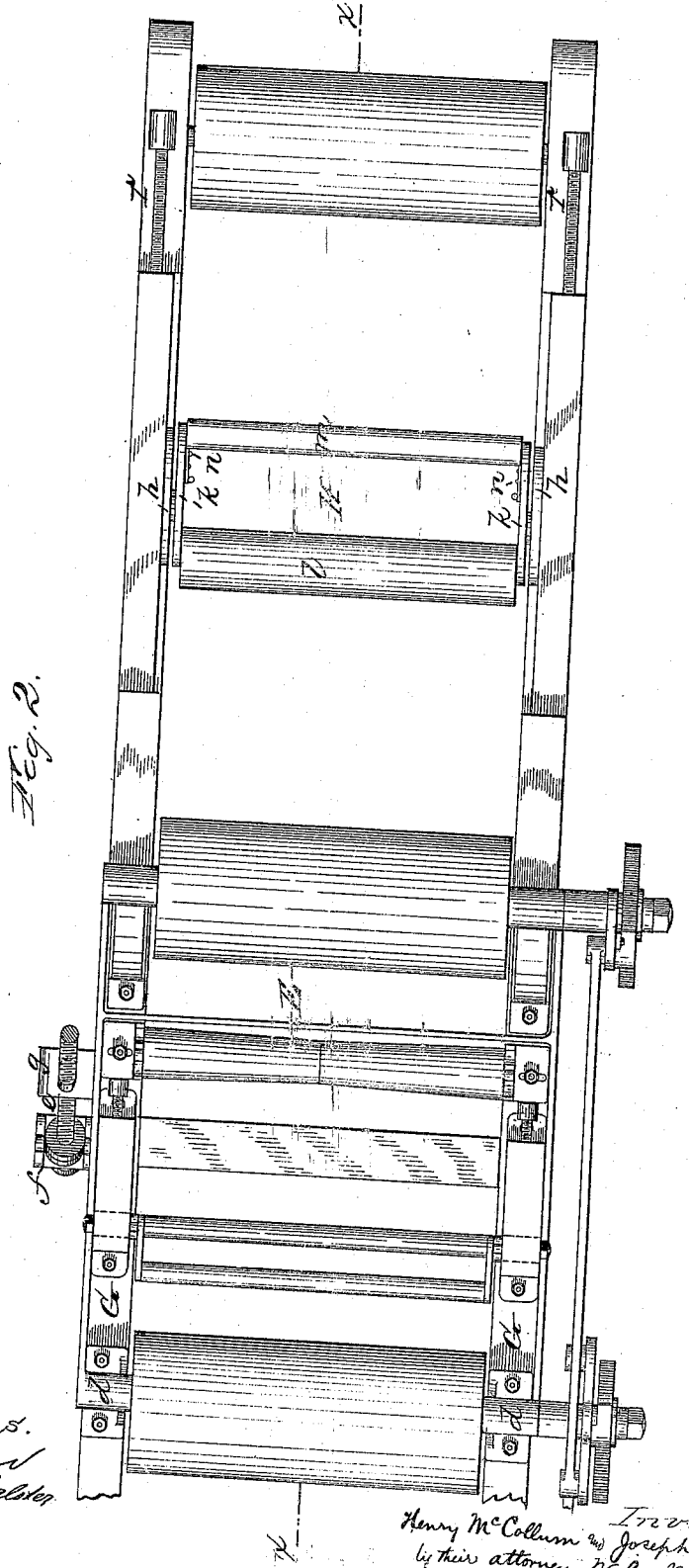

Figure 1 is a side elevation of the improved machine, showing the scrap-removing apparatus raised out of operative position. Fig. 2 is a top view of a portion of the machine, showing the scrap-removing apparatus in position. Fig. 3 is a section through the lines $x$ $x$ of Fig. 2. Figs. 4, 5, and 6 are detail views. Fig. 7 represents diagrammatically the scrap-removing apron; Fig. 8, the aprons of the machine when it is arranged as shown in Fig. 1, and Fig. 9 the aprons of the machine when it is arranged as shown in Fig. 3.

Like letters of reference in the several drawings indicate like parts.

Fig. 1 represents the improved cracker-machine adjusted for peeling the crackers off from the cracker-apron by means of the ordinary peeling knife or shovel, this being the usual method of removing from the cracker-apron the larger and more common lines of goods—such as soda and milk crackers, &c. In full lines in this figure is represented the preferred arrangement of the cracker-apron for this peeling adjustment of the machine— to wit, with the lower roller removed, and the additional length of the apron secured thereby utilized at the front end of the machine, whereby a foot or two of additional upper apron-surface is secured for the greater convenience in the peeling operation.

Figs. 2 and 3 represent a part of the improved cracker-machine adjusted for scrapping and panning—that is, for delivering the cut crackers directly onto pans—this being the usual method of dealing with the smaller and finer lines of goods. The additional roller referred to, placed below the driving-roller, is of course used in this case, as a short apron is required, at the front end of the machine, as shown.

A is the cracker-apron. It is driven by the driving-roller B.

C is a pressure-roller, preventing slipping of the cracker-apron on the driving-roller B. The dough is delivered onto the cracker-apron at $a$ after having passed through the pressing apparatus $b$ at the back end of the machine. It is carried along by the cracker-apron under the cutting apparatus D, which is of any usual or desired construction, where the crackers are cut and stamped in the usual way. If the crackers are to be peeled off from the apron, the scrap is removed by hand after the cracker-apron has passed the cutter, and the scrap apparatus E is swung up out of the way, the cracker-apron moving on horizontally, as shown in Figs. 1 and 8, and carrying the cut crackers, which are then peeled or shoveled off in the usual way by the operator, the five or six feet in length of the apron which is exposed by the swinging up of the scrap apparatus being ordinarily sufficient to permit of this peeling operation. If the crackers are to be panned, the scrap apparatus E is lowered into place, the scrap is started up on the apron of that scrap apparatus and is removed thereby, being discharged from the apron into any suitable receptacle in the usual manner, and the crackers are carried along in the usual way on the cracker-apron, which is now inclined, as shown in Fig. 9, and are fed off onto the pans on the pan-apron F in the usual manner. This scrap apparatus E is of any ordinary or desired construction. Instead of being bolted to the frame of the machine, as heretofore, it is bolted to a separate cast-iron or other suitable frame, G, which is made strong enough to carry the entire scrap apparatus E. This scrap-frame G is pivoted at one end, d, the end toward the cutters, and the back of the machine pivoted to the frame of the machine on both sides. When this frame is swung down, so that the scrap apparatus E is in position to operate in the usual way in connection with the rest of the machine, the frame G rests solidly on the general frame of the machine along both sides, and is firmly held in place by convenient fastenings. When the frame G is swung up, it carries the whole of the scrap apparatus E up out of the way of the operator, who is peeling or shoveling the crackers off from the cracker-apron A.

We do not limit ourselves to the special means shown in the drawings for moving this scrap-frame G in and out of operative position, as any means may be employed to accomplish that movement. I have shown in the drawings, and find most convenient in practice, a long and strong screw, e, seated and freely revolving against a shoulder in a stout projection, f, of the frame of the machine, and working in a nut, g, firmly fixed to the scrap-frame G at one side. The parts f and g are both made capable of revolution to accommodate the changing angle of the screw in any usual way. By means of this screw the scrap-frame G may be swung in or out of operative position at will. The cracker-apron at the front end of its traverse passes around the device which is shown in detail in Figs. 4, 5, and 6. This device, which is marked H in the drawings, and which may be called the "knife-reversing apparatus," is intended to make the cracker-apron inclined on the last part of its traverse toward the front when the crackers are to be panned, and to make the same apron horizontal at the same point when the crackers are to be peeled off. It consists of the two side plates or bearings, h h, which are adjustable in the slots i i in the frame of the machine, sliding backward and forward the full length of such slots, and having means of securely clamping them at any point along those slots or guides, such as the screws r r. These plates h h furnish bearings for the frame k, which consists at one side of the axis carrying the roller l, and at the other side, but not one hundred and eighty degrees from it, of the blunt knife-edge m, as shown clearly in the drawings.

Means are provided for locking the frame k to the side plates, h h, to wit: the pins n n, when the frame k is revolved in its bearings so as to throw the knife-edge m to the front, and as close down to the surface of the pan-apron F as the presence of the pans on that apron will permit. In that position the parts are locked and securely held, and the cracker-apron passes over and around the blunt edge of the knife m and back under it, the crackers being fed onto the pans on the pan-apron F and carried along by that apron. This is the position of the parts when the machine is adjusted for panning, and is shown in Figs. 2, 3, and 9. In this position of the frame k the roller l is thrown backward and is inoperative. The cracker-apron is here inclined. Similar means are provided for locking the frame k to the side plates, h h, when the frame k is unlocked from its previous position and is revolved in its bearings, so as to throw the roller l to the front with its upper surface on a level with the level of the apron at the cutters. In that position the parts are locked and securely held, and the cracker-apron passes over and around the roller l, and back under it. In this position of the parts the knife-edge m is thrown backward and is inoperative. The cracker-apron is horizontal. This is the position of the parts when the machine is adjusted for peeling the crackers off the apron, and is shown in Figs. 1 and 8. The scrap frame G is in this case swung out of the way, and the peeling off of the crackers is done on the five or six feet of surface of the cracker-apron A thus exposed. A horizontal apron is more convenient for this peeling operation, and a roller presents less friction to the apron than a knife-edge. The knife must be used in the former case in order to deliver the crackers almost down on the surface of the pans and flat and right side up, the knife-edge in its low position being the means and the incline of the apron being an incidental result of this operation. The whole knife-reversing apparatus H being adjustable back and forth in the slots i i of the frame, furnishes the means of tightening the cracker-apron A in any adjustment of the machine. The cracker-apron A on its return to the back end of the machine, after passing over the usual supporting-rollers, passes down and around the slack-roller K, or roller to take up the slack of the apron, before returning again to the driving-roller B. This roller K is designed to give a longer traverse to the cracker-apron, and thereby permit of the use of a longer apron, which increased length of apron may be utilized whenever desired at the front end of the machine to give a great surface of apron for the peeling or shoveling operation, the roller K being simply removed and the slack of the apron being taken up by the adjustment of the knife-reversing apparatus H in the slots $i$ $i$, the slots being made long enough for that purpose. Panning requires a short apron at the front end of the machine, so that the roller K must be in place and the cracker-apron A must pass around it in the adjustment of the improved machine for panning, unless, indeed, the pan-apron F were considerably extended backward beyond what is shown in the drawings, which would be objectionable as causing the crackers to travel too far, which tends to spoil their surface. This possible additional length of apron at the front is, however, a useful feature, although not a necessary feature, in the adjustment of the machine for peeling, as in the position of the roller K shown in the drawings it adds a foot or two to the surface of apron exposed for peeling by the swinging up of the scrap-frame G. We do not wish to limit ourselves to its use in combination with the apparatus swinging up the scrap-frame, as this roller K may be used alone, and if placed far enough toward the back end of the machine it will permit of the use of an apron in the panning adjustment of the machine long enough to furnish in the peeling adjustment of the machine sufficient surface of apron in front of the scrap apparatus for the peeler to operate upon. In this case the swinging out of position of the scrap apparatus would be unnecessary. We prefer the combination of the methods shown in the drawings, as the crackers have not so far in that case to travel, and the driving-roller B has a better frictional hold on the cracker-apron A.

We are aware that devices have been used for the purpose of rendering a panning-machine convertible into a peeling-machine, and we do not broadly claim producing that result; but the devices so used have been confined to provisions for a lengthening of the apron at the front end of the machine, and this by the employment, among other mechanisms, of two additional removable rollers, around which the apron passes, being bent back on itself, and the insertion of an additional roller at the front of the machine when the extra length of apron is to be utilized there. This arrangement causes such a drag on the apron that it is impracticable to operate such a machine successfully. Our arrangement of the removable roller K is simple, and avoids the defects of these prior machines.

What we claim as new, and desire to secure by Letters Patent, is—

1. In combination with the cracker-apron and the usual driving and cutting mechanisms of a cracker-machine, the scrap-removing mechanism and a pivoted frame carrying the same, whereby the scrap-removing mechanism may be swung out of operative position and the cracker-apron be properly exposed for peeling, substantially as shown and described.

2. In combination with the cracker-apron and the usual driving and cutting mechanisms of a cracker-machine, the scrap-removing mechanism and a pivoted frame carrying the same, and the knife-reversing apparatus described, whereby a horizontal surface of the cracker-apron may be properly exposed for peeling, substantially as and for the purposes set forth.

3. In combination with the cracker-apron and the usual driving and cutting mechanisms of a cracker-machine, the scrap-removing apparatus, and a pivoted frame carrying the same, and the knife-reversing mechanism H, adjustable in the frame of the machine, whereby a horizontal surface of the cracker-apron may be properly exposed for peeling and kept tight, substantially as and for the purposes set forth.

4. In combination with a cracker-apron and the usual driving and cutting mechanisms of a cracker-machine, the scrap-removing apparatus E and pivoted frame G, the knife-reversing mechanism H, adjustable in the frame of the machine, and the removable roller K, whereby an increased horizontal surface of the cracker-apron may be exposed for peeling, substantially as shown and described.

5. In combination with a cracker-apron and the usual driving and cutting mechanisms of a cracker-machine, the removable roller K, and the knife-reversing mechanism H, having knife-edge $m$ and roller $l$ mounted in bearings $i$ $i$ in the frame, whereby an additional horizontal surface of apron may be utilized at the front end of the machine, substantially as and for the purposes set forth.

6. In a cracker-machine, the combination of the scrap-removing apparatus E with a pivoted frame, G and screw $e$, having bearings $f$ and $g$, substantially as and for the purposes set forth.

HENRY McCOLLUM.
JOSEPH PARR.

Witnesses:
WILLIAM H. KENYON,
JOHN C. JOHNSTON.